United States Patent
Lowe et al.

(10) Patent No.: US 11,029,164 B2
(45) Date of Patent: Jun. 8, 2021

(54) DYNAMIC DETERMINATION OF ROUTE CONCLUSION BEFORE REACHING DESTINATION

(71) Applicant: General Motors LLC, Detroit, MI (US)

(72) Inventors: Dexter C. Lowe, Macomb, MI (US); Ryan Olejniczak, Macomb, MI (US); Esteban Camacho, Belleville, MI (US)

(73) Assignee: General Motors LLC, Detroit, MI (US)

( * ) Notice: Subject to any disclaimer, the term of this patent is extended or adjusted under 35 U.S.C. 154(b) by 233 days.

(21) Appl. No.: 16/406,553

(22) Filed: May 8, 2019

(65) Prior Publication Data
US 2020/0355509 A1 Nov. 12, 2020

(51) Int. Cl.
*G01C 21/34* (2006.01)
*G01C 21/36* (2006.01)

(52) U.S. Cl.
CPC ..... *G01C 21/3423* (2013.01); *G01C 21/3655* (2013.01)

(58) Field of Classification Search
CPC ............ G01C 21/3423; G01C 21/3655; G01C 21/00; G01C 21/34; G01C 21/343
See application file for complete search history.

(56) References Cited

U.S. PATENT DOCUMENTS

| | | | |
|---|---|---|---|
| 2006/0178821 A1* | 8/2006 | Brulle-Drews | G08G 1/0969 701/431 |
| 2011/0063132 A1* | 3/2011 | Trum | G08G 1/096775 340/932.2 |
| 2018/0094943 A1* | 4/2018 | Grochocki, Jr. | G01C 21/3484 |

FOREIGN PATENT DOCUMENTS

WO WO-2010081550 A1 * 7/2010 ......... G01C 21/3679

* cited by examiner

*Primary Examiner* — Khoi H Tran
*Assistant Examiner* — Tristan J Greiner
(74) *Attorney, Agent, or Firm* — Lorenz & Koph, LLP

(57) ABSTRACT

Vehicle navigation systems and methods may generally provide navigation instructions in a vehicle. A navigation guidance session to a destination may be initiated at a telematics unit installed to the vehicle. Upon determination that the vehicle has been parked, example methods and systems may facilitate continuing the navigation guidance session when a park time duration is less than a pedestrian travel time associated with pedestrian travel from the vehicle parking location to the destination. Alternatively, terminating the navigation guidance session may be facilitated when the park time duration is at least equal to the pedestrian travel time.

20 Claims, 3 Drawing Sheets

DYNAMIC DETERMINATION OF ROUTE CONCLUSION BEFORE REACHING DESTINATION

Navigation systems and methods for vehicles allow a user to input a destination and obtain directions from a current location of the vehicle. Known navigation and routing methodologies for vehicles expect the vehicle to cross a finite destination point to mark route as complete. As such, in situations where a user does not reach the destination, e.g., by parking some distance from the destination, the navigation system may not realize that the user has reached the destination. The navigation system may therefore believe the user is still en route to the destination when the user re-enters the vehicle, and may continue to provide directions "to" the destination. This may confuse the user, or may force the user to cancel the destination from the route guidance. Moreover, if the user cancels the destination, the navigation system may fail to understand that the cancelled route was "successfully" completed.

Accordingly, there is a need for an improved vehicle navigation system and method of navigating a vehicle that addresses the above problems.

SUMMARY

Described herein are embodiments of a method of providing navigation instructions in a vehicle. One example method may include the steps of initiating a navigation guidance session to a destination for the vehicle at a telematics unit installed to the vehicle; determining that the vehicle has been parked in a parking location at a park time before the vehicle reaches the destination, the parking location being within a predetermined maximum distance of the destination; determining that a user has left the vehicle while the vehicle is in the parking location; determining a pedestrian travel distance from the parking location to the destination, and determining a pedestrian travel time for the determined pedestrian travel distance; detecting a vehicle restart; and determining a park time duration from at least the park time and the vehicle restart. The method may further include continuing the navigation guidance session when the park time duration is less than the pedestrian travel time; and terminating the navigation guidance session when the park time duration is at least equal to the pedestrian travel time.

In some embodiments, the navigation guidance session is continued or terminated automatically by the telematics unit. Alternatively, the navigation guidance session may be continued or terminated automatically by a remote facility. In another alternative approach, the navigation guidance session is continued or terminated by a user prompt provided by the telematics unit.

In some embodiments, the step of determining a user has left the vehicle includes determining that a keyfob paired with the vehicle has left a proximity of the vehicle.

In at least some embodiments, the step of determining a user has left the vehicle includes determining that a Bluetooth device paired with the vehicle has left a proximity of the vehicle.

In some embodiments, a method further includes determining a time-to-live (TTL) from at least a distance from the parking location to the destination. In at least a subset of these example methods, the time-to-live may be determined from at least an average pedestrian travel speed.

In some embodiments, the telematics unit is configured to terminate the navigation guidance session in response to receiving a navigation termination command from a passenger of the vehicle.

In other embodiments of a method of providing navigation instructions in a vehicle, the method may include initiating a navigation guidance session to a destination for the vehicle at a telematics unit installed to the vehicle; determining that the vehicle has been parked in a parking location at a park time before the vehicle reaches the destination, the parking location being within a predetermined maximum distance of the destination; determining that a user has left the vehicle while the vehicle is in the parking location; determining a pedestrian travel distance from the parking location to the destination, and determining a pedestrian travel time for the determined pedestrian travel distance; detecting a vehicle restart; and determining a park time duration from at least the park time and the vehicle restart. This example method may further include automatically continuing the navigation guidance session when the park time duration is less than the pedestrian travel time; and automatically terminating the navigation guidance session when the park time duration is at least equal to the pedestrian travel time.

In some embodiments, the step of determining a user has left the vehicle includes determining that a keyfob paired with the vehicle has left a proximity of the vehicle.

In at least some embodiments, the step of determining a user has left the vehicle includes determining that a Bluetooth device paired with the vehicle has left a proximity of the vehicle.

In some embodiments, a method further includes determining a time-to-live (TTL) from at least a distance from the parking location to the destination. In at least a subset of these example methods, the time-to-live may be determined from at least an average pedestrian travel speed.

Example systems are also disclosed for navigating a vehicle. In at least some embodiments, the system may include a telematics unit installed in the vehicle and configured to provide a route to a destination to a vehicle user in a navigation guidance session. The telematics unit may be configured to determine that the vehicle has been parked in a parking location at a park time before the vehicle reaches the destination, the parking location being within a predetermined maximum distance of the destination; determine that a user has left the vehicle while the vehicle is in the parking location, determine a pedestrian travel distance from the parking location to the destination, and a pedestrian travel time for the determined pedestrian travel distance, detect a vehicle restart; and determine a park time duration from at least the park time and the vehicle restart. The telematics unit may be configured to continue the navigation guidance session when the park time duration is less than the pedestrian travel time, and terminate the navigation guidance session when the park time duration is at least equal to the pedestrian travel time.

In at least some of the foregoing embodiments, the system may further include a remote facility separate from the vehicle, the remote facility configured to communicate with the vehicle to provide information used to determine the route to the destination in the navigation guidance session.

In some example approaches, the telematics unit is configured to continue or terminate the navigation guidance session automatically in response to determining that the park time duration is less than the pedestrian travel time or that the park time duration is at least equal to the pedestrian travel time, respectively. Alternatively, some example systems may include the telematics unit being configured to continue or terminate the navigation guidance session by providing a prompt to the user to continue or terminate the navigation guidance session, respectively.

In some embodiments, the system additionally includes a keyfob paired with the vehicle for starting the vehicle, wherein the telematics unit is configured to determine the user has left the vehicle when the keyfob has left a proximity of the vehicle.

In at least a subset of the embodiments, a Bluetooth transmitter may be installed to the vehicle, wherein the telematics unit is configured to determine the user has left the vehicle when a Bluetooth device paired with the transmitter has become unpaired with the transmitter.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Embodiments described herein are directed to navigation systems and methods that dynamically determine that a navigation route has been completed even though the vehicle has not reached the destination. In some examples, elapsed time between a vehicle stopping or parking and being restarted is used along with a proximity of the vehicle to the destination endpoint where the vehicle is stopped/parked. Thus, it may be determined whether an occupant of the vehicle has traveled to/from the destination by other means, e.g., on foot. Accordingly, the user need not cancel an existing navigation session to the destination, even though the vehicle has not itself "reached" the destination. The navigation system, vehicle, and/or a remote facility used in providing navigation to the vehicle may also more accurately determine when a navigation route is successfully completed, with the understanding that the user has likely reached the intended destination even though the vehicle has not fully traveled to the destination.

As discussed further below, in some embodiments of a method of navigating a vehicle, a navigation destination may be established for a navigation system, e.g., by a user entering a desired address, contact, point of interest (POI), or the like. If, prior to the vehicle reaching the destination, the vehicle is stopped or turned off for a period of time— thereby indicating that the vehicle has been parked—the navigation system may determine whether enough time elapses while the vehicle is stopped to create an expectation that the user has reached the destination by other means of travel, e.g., by walking. In such cases, the navigation system may terminate the current navigation session, such that the destination is no longer active in the vehicle upon being restarted by the user. As will be detailed further below, in some embodiments a boundary may be provided around the requested destination to determine if the vehicle/user is within an acceptable vicinity, e.g., such that it is possible for the user to walk to the destination from the vehicle's current location. If the vehicle is within this boundary, the navigation system may determine a time duration for a pedestrian to walk to the destination and back. If the vehicle does not re-start within the time duration, the navigation system may cancel or terminate the current navigation session. On the other hand, if the vehicle is restarted or moved before the expiration of the time duration (e.g., indicating the user has made a relatively quick stop for refueling the vehicle), the navigation session may be continued. In some embodiments, if the navigation session is continued, the navigation system may prompt the user to confirm that the navigation session should be continued. While embodiments described below are generally directed to user-driven vehicles, the concepts herein can be applied in the context of autonomous or semi-autonomous vehicles as well.

Figure 1:
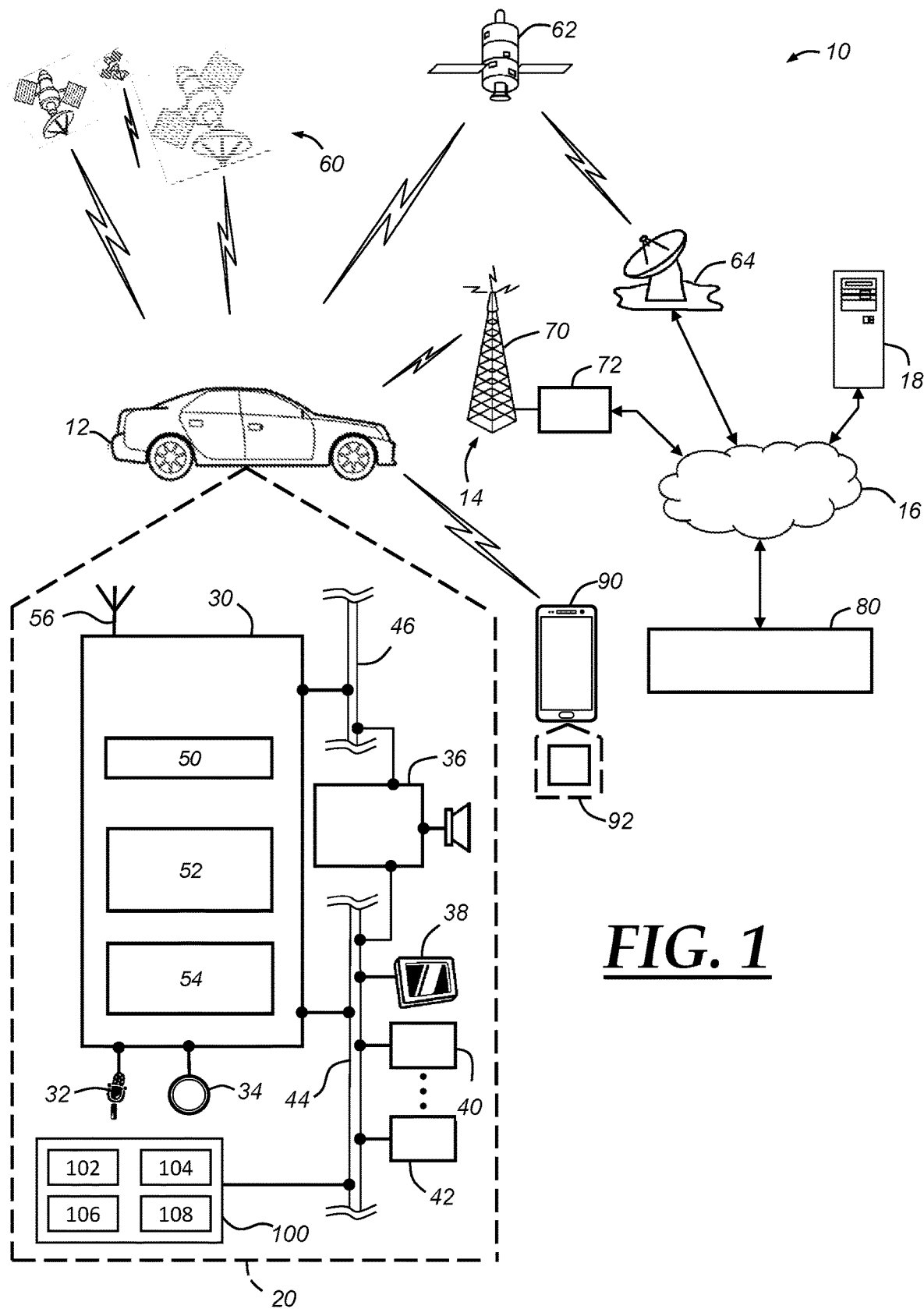
FIG. 1 is a block diagram depicting an embodiment of a communications system that is capable of utilizing the exemplary methods disclosed herein.

Turning now to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a telematics unit 30, a microphone 32, one or more pushbuttons or other control inputs 34, an audio system 36, a visual display 38, a GPS module 40, a cruise control system 100, as well as a number of other vehicle system modules (VSMs) 42. Some of these devices can be connected directly to the telematics unit such as, for example, microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art, or via other wireless communication methods, e.g., SMS/text messages. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 30 utilizes cellular communication according to GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 18, for other purposes, such as fleet management. Also, new or updated map data can be downloaded to the GPS module 40 from the remote facility 80 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the remote facility 80. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Cruise control system 100 may control one or more components of the vehicle power system (e.g., the throttle valve of a vehicle with an internal combustion engine or the power controller regulating power delivery from a vehicle battery to an electric motor in an electric vehicle) and vehicle brake system to maintain a predetermined vehicle speed. The cruise control system 100 may be an adaptive cruise control system, in which the system 100 controls or monitors vehicle position relative to other vehicles. Moreover, in some examples the cruise control system 100 provides, at least in part, semi-autonomous driving of the vehicle 12, and in some cases fully autonomous driving of the vehicle 12. Accordingly, in addition to controlling speed and/or position of the vehicle 12 relative to other vehicles, the cruise control system 100 may control steering wheel position of the vehicle 12, or otherwise guide the vehicle 12 by directing the vehicle 12 while the cruise control system 100 is activated. The cruise control system 100 may be a super cruise system, where the vehicle 12 generally guides the vehicle 12 on a road such that a driver can cruise at a desired speed or range of speeds, and need not manually steer the vehicle 12 to maintain the vehicle in a desired lane and/or avoid other vehicles.

System 100 may include a user interface 102, vehicle interface 104, communications module 106 and controller 108. User interface 102 is configured to receive inputs from a driver of vehicle 12 including a desired vehicle speed and desired position relative to other vehicles and to generate outputs to the driver or other vehicle occupants including confirmation of the inputs. The cruise control system 100 may receive other information input by the driver, e.g., a destination point or route, along which the cruise control system 100 is to guide the vehicle 12. The cruise control system 100 may receive such inputs directly from the driver by way of the user interface 102, or from other vehicle components via the vehicle interface 104. For example, the cruise control system 100 may receive instructions or information from the telematics unit 30 over the bus 44. The user interface 102 may include any combination of hardware, software and/or other components that enable the driver to exchange information or data with the vehicle 12. The interface 102 typically includes touch screen displays, pushbuttons or other mechanisms on the instrument panel (or dashboard) or steering column. Vehicle interface 104 is configured to receive input signals from a plurality of sensors used to detect operating conditions of the vehicle including, for example, wheel speed sensors that are coupled to each wheel of vehicle 12 and separately report the rotational velocity of each wheel and sensors that are used to detect the position of other vehicles on the road including, for example, light detection and ranging (LIDAR) devices, ultrasonic devices, radio detection and ranging (RADAR) devices, and vision devices (e.g., cameras, etc.) used in vehicle collision avoidance systems such as a forward collision warning systems, front automatic braking systems, forward or rear park assist systems, lane departure warning systems, side blind zone alert systems, side or rear object detection systems, or rear automatic braking systems. Interface 104 is also configured to transmit output signals to components of the vehicle power system and vehicle brake system for use in controlling the vehicle power system and vehicle brake system. Communications module 106 may include any combination of hardware, software and/or other components that enable wireless voice and/or data communication between system 100 and systems external to vehicle 12 or internal to vehicle 12 such as telematics unit 30. Module 106 may, for example, include a radio transceiver configured for short range wireless communication with telematics unit 30 using short-range wireless technologies such as Wi-Fi (IEEE 802.11), WiMAX, Wi-Fi direct, Bluetooth, Zigbee, near field communication (NFC), etc. in order to obtain geographic information such as updated maps used in predictive control. Controller 108 is configured to generate control signals for the vehicle power system and vehicle brake system responsive to inputs received through the user interface 102, vehicle interface 104 and communications module 106. The controller 108 may include various electronic processing devices (e.g., a microprocessor, a microcontroller, an application specific integrated circuit (ASIC), etc.) and memory devices.

As will be described further below, in some embodiments the display 38 or other user interface (e.g., user interface 102) may allow for an occupant of the vehicle 12 to provide inputs to the telematics unit 30 and/or cruise control system 100 in regard to navigation functions. Merely as examples, a user may select a passenger route endpoint (e.g., a destination such as an address, point of interest, or contact), cancel a navigation request, or the like. As will also be discussed further below, the vehicle 12 may automatically continue or discontinue a navigation session, e.g., to a given destination, after the vehicle 12 has been turned off for a period of time.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/ base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 80. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 18 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 16. A database at the remote facility can store account information such as subscriber authentication information, vehicle identifiers, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

The remote facility 80 may include a database of roads, routes, locations, etc. permitted for use with a semi-autonomous or fully autonomous driving system associated with one or more vehicles 12. As will be described further below, the remote facility may communicate with the vehicle(s) 12 to provide route guidance in response to a request received from the vehicle(s) 12, and in some cases may fully control navigation of the vehicle 12. For example, the remote facility 80 may determine passenger endpoint locations based upon information received from vehicle 12 or other sources, which will be described further below.

Mobile device 90 is a non-vehicle device, meaning that it is not a part of vehicle 12 or vehicle electronics 20. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application 92 that can allow a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. Wireless device 90 is shown as a smartphone having cellular telephone capabilities. In other embodiments, device 90 may be a tablet, laptop computer, or any other suitable device. In addition, application 92 may also allow the user to connect with the remote facility 80 or call center advisors at any time.

While a single vehicle 12 is illustrated in FIG. 1, in the exemplary methods described below it should be understood that multiple vehicles 12, and in some cases many vehicles 12, may be present. For example, a number of vehicles 12 may be traveling on one or more roads, and communicating with remote facility 80 to provide guidance or other assistance to vehicle 12.

Figure 2:
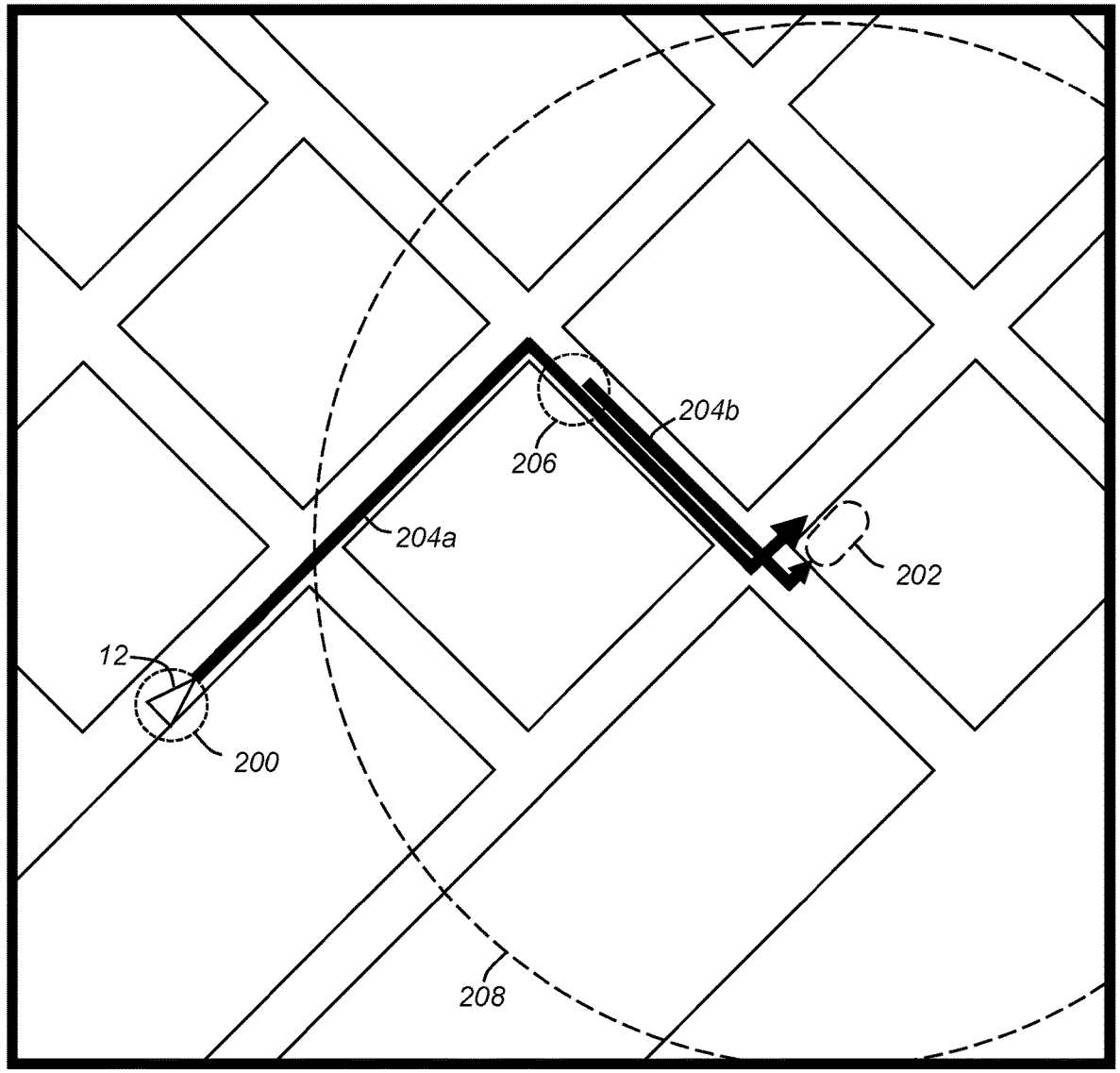
FIG. 2 is a schematic diagram depicting an embodiment of a navigation route from a current vehicle location to a destination.

Turning now to FIG. 2, an example navigation methodology is illustrated for use with vehicle 12 and/or telematics unit 30. Here, the vehicle 12 is being driven (by the user/driver, semi-autonomously, or autonomously) from a current location 202 to a destination 202. The telematics unit 30 initially may define a route 204a for the vehicle 12 to travel to get to a destination 202.

As the vehicle 12 traverses the route 204a and reaches intermediate location 206, the driver of the vehicle 12 decides the park the vehicle 12. Merely as one example, the driver may observe traffic along the route 204a, and determine they can reach the destination 202 more efficiently or quickly by parking the vehicle 12 and walk the remaining distance to the destination 202 on foot. Such an example may be particularly prevalent where the destination 202 covers a relatively large area, where there are parking restrictions near the destination 202, or where there is relatively high traffic in area(s) surrounding the destination 202, merely as examples. Accordingly, the driver may park the vehicle 12, and walk along a pedestrian route 204b to the destination 202. Subsequently, the user may walk back to the vehicle 12 at the intermediate/parking location 206, and restart the vehicle. Upon restarting the vehicle 12, the telematics unit 30 may determine a likelihood that the user will no longer need to continue the previous navigation session to the destination 202. In some examples, as discussed in more detail below, the telematics unit may determine whether sufficient time has elapsed since the vehicle 12 was parked or turned off to allow the user to walk to the destination 202 and return to the vehicle 12 at the intermediate location 206. A maximum consideration zone 208 may be defined about the destination 202, indicating a maximum distance within which the telematics unit 30 will consider continuing/discontinuing the previous navigation session using the methodology, as also described further below.

Figure 3:
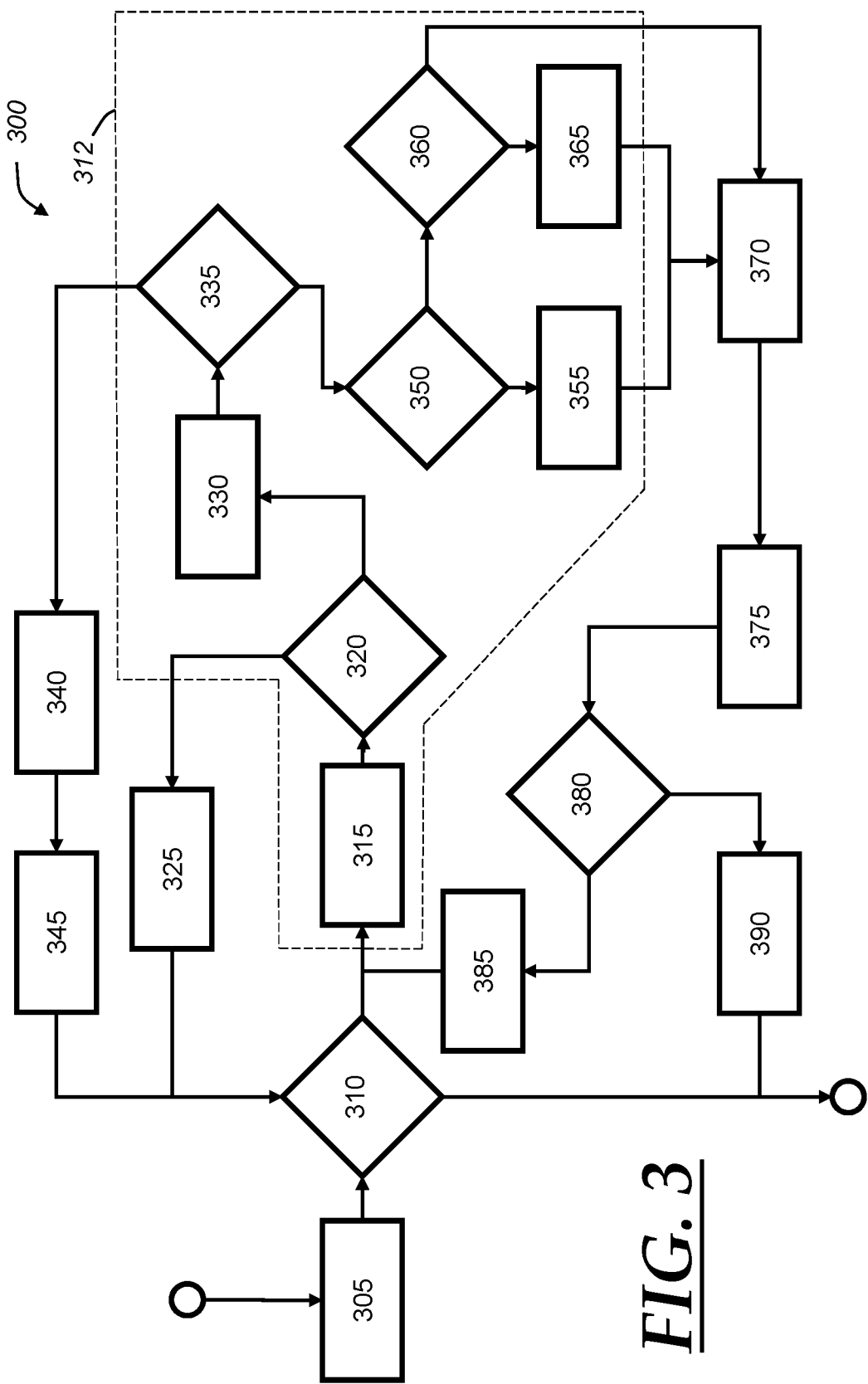
FIG. 3 is a process flow diagram illustrating example methods of communicating with or guiding one or more vehicles.

Turning now to FIG. 3, a process 300 of providing navigation instructions in a vehicle is illustrated, according to one embodiment. Process 300 may begin at block 305, where a navigation guidance session may be initiated for a vehicle. For example, telematics unit 30 may receive a destination from a user/driver of the vehicle 12, from remote facility 80, by way of the application 92, or by any other manner that is convenient.

Proceeding to block 310, process 300 may query whether a destination is currently active at the telematics unit 30. Where no destination is active (e.g., where the user or remote facility has cancelled a navigation session, process 300 may terminate.

If the destination remains active, process 300 proceeds to determine whether the vehicle 12 has been parked or turned off within a maximum range (e.g., as defined by zone 208) for a sufficient time such that the destination should be automatically cancelled, e.g., by the telematics unit 30 and without intervention from a user of the vehicle 12. This may include determining that a user has left the vehicle while the vehicle is in the parking location, i.e., at intermediate location 206. These determination(s) may generally be represented in process 300 by subprocess 312, an example of which is discussed further below.

In the example process 300 illustrated in FIG. 3, process 300 may proceed from block 310 to block 315. At block 315, process 300 may determine that the vehicle 12 has been placed into park mode, e.g., as indicated by a transmission of the vehicle 12 being shifted into park, the parking brake applied, or the like. Upon detecting the vehicle 12 being placed into park mode, process 300 may query whether the vehicle 12 has been turned off at block 320, e.g., by way of an ignition switch, push button, or the like. Where process 300 determines the vehicle 12 is still on, process 300 may proceed to block 325 where the current navigation session is kept active, and then back to block 310. On the other hand, if the vehicle 12 is turned off, process 300 proceeds to block 330.

At block 330, process 300 may determine a pedestrian travel distance from the parking location to the destination. For example, as described above telematics unit 30 may determine a walking distance as defined by the pedestrian route 204b.

Proceeding to block 335, process 300 may query whether the intermediate location 206 of the vehicle 12 is within a predetermined maximum distance or pedestrian travel time of the destination 202. For example, as discussed above a zone 208 may be used to filter out larger distances where it is improbable that the driver/user will continue traveling to the destination 202 as a pedestrian. In one approach, a maximum distance of 1.5 miles may be used, however this distance/pedestrian travel time maximum may be increased or decreased. If the intermediate location 206 is not within the predetermined maximum distance, process 300 may proceed to block 340, where the destination is kept active. Process 300 may then proceed to block 345, where a vehicle re-start is detected, indicating the user will then continue navigating using the current navigation session. Process 300 may then proceed back to block 310.

Where it is determined at block 335 that the vehicle 12/intermediate location 206 is located within the predetermined maximum distance, process 300 may proceed to block 350. Block 350 and subsequent blocks 355, 360, and 365 may be used to determine whether the user has left the vehicle. For example, as illustrated in FIG. 3, at block 350 process 300 may query whether a key fob detection is available in the vehicle 12. In one example, a keyfob or other device matched to the vehicle may be used to start or actuate the vehicle 12, and the vehicle 12 may be configured to determine whether the keyfob is located within the vehicle or in proximity to the vehicle 12. If key fob detection is available, process 300 proceeds to block 355, where process 300 awaits the keyfob of the vehicle 12 being carried away from the vehicle 12 to indicate the user has left the vehicle 12. Process 300 may then proceed to block 370. If, on the other hand, keyfob detection is not available, process 300 may proceed to use a different manner of determining whether the user has left the vehicle 12. In one example, at block 360 process 300 may use query whether a Bluetooth device is paired with the vehicle 12. If a Bluetooth device is currently paired, the vehicle 12 may wait to detect that the device has become unpaired or otherwise left proximity of the vehicle 12, thereby indicating that the user has left the vehicle 12. Process 300 may then proceed to block 370. It should be noted that other means of determining whether a user has left the vehicle 12 may be employed, e.g., if keyfob detection is not available and a Bluetooth device is not paired with the vehicle. Merely as one example, the opening/closing of a door of the vehicle 12 may be detected.

Proceeding to block 370, process 300 may determine a pedestrian travel time (PTT) for the determined pedestrian travel distance from block 330. For example, telematics unit 30 may determine a distance associated with the pedestrian route from the intermediate location 206 to the destination 202. The telematics unit 30 may determine an amount of time for a pedestrian to traverse the route 204b to and from the destination 202, e.g., using an average walking speed of a pedestrian. In one embodiment, a pedestrian travel time may be determined by using an average walking speed of 3.1 miles per hour (mph) to calculate a time-to-live (TTL) for the navigation session. More specifically, using the expected walking speed in miles-per-hour, and the distance from the intermediate location 206 to the destination 202 in miles, a time-to-live associated with walking from the intermediate location 206 to the destination 202 and back may be determined in minutes (e.g., TTL=PTT/AWS*60*2). In one embodiment, the TTL begins counting down upon detection of the user leaving the vehicle 12.

Proceeding to block 375, process 300 may detect that the vehicle 12 has been restarted. Process 300 may then proceed to block 380, and query whether the TTL has expired. In one embodiment, process 300 determines a park time duration from at least the park time and a time associated with the vehicle restart detected at block 375, and compares this with the TTL determined at block 370. In examples where the TTL is used as a countdown timer, process 300 may query whether the TTL has expired.

Where it is determined at block 380 that sufficient time has elapsed exceeding the PTT determined at block 370, or that the TTL determined at block 370 has expired, process 300 may proceed to block 390, where the current navigation session or route is terminated. Process 300 may then terminate.

Alternatively, where it is determined at block 380 that sufficient time has not passed, e.g., to allow the user to walked to/from the destination 202, process 300 may proceed to block 385. At block 385, process 300 continues the current navigation session, and then may proceed back to block 315 to allow the user to continue to the destination 202 using the telematics unit 30.

It should be noted that in each of blocks 385 and 390, the telematics unit 30 may act automatically to continue or terminate the current navigation session. Alternatively, in one or both of blocks 385, 390, the telematics unit 30 may prompt the user to continue or cancel the current navigation session. In any event, the telematics unit 30 may proactively intervene in both of blocks 385 and 390 to either present the user with a choice to continue/discontinue the previous navigation session, or automatically continue/discontinue the previous navigation session.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of providing navigation instructions in a vehicle, comprising:
   (a) initiating a navigation guidance session to a destination for the vehicle at a telematics unit installed to the vehicle;
   (b) determining that the vehicle has been parked in a parking location at a park time before the vehicle reaches the destination, the parking location being within a predetermined maximum distance of the destination;
   (c) determining that a user has left the vehicle while the vehicle is in the parking location;
   (d) in response to the determinations in steps (b) and (c), determining (1) a pedestrian travel distance from the parking location to the destination, and (2) a pedestrian travel time for the determined pedestrian travel distance;
   (e) detecting a vehicle restart;
   (f) determining a park time duration from at least the park time and the vehicle restart; and
   (g1) continuing the navigation guidance session when the park time duration is less than the pedestrian travel time; and
   (g2) terminating the navigation guidance session when the park time duration is at least equal to the pedestrian travel time.

2. The method of claim 1, wherein the navigation guidance session is continued in step (g1) or terminated in step (g2) automatically by the telematics unit.

3. The method of claim 1, wherein the navigation guidance session is continued in step (g1) or terminated in step (g2) automatically by a remote facility.

4. The method of claim 1, wherein the navigation guidance session is continued in step (g1) or terminated in step (g2) by a user prompt provided by the telematics unit.

5. The method of claim 1, wherein step (c) includes determining that a keyfob paired with the vehicle has left a proximity of the vehicle.

6. The method of claim 1, wherein step (c) includes determining that a Bluetooth device paired with the vehicle has left a proximity of the vehicle.

7. The method of claim 1, wherein at least one of steps (f), (g1), and (g2) includes determining a time-to-live (TTL) from at least a distance from the parking location to the destination.

8. The method of claim 7, wherein the TTL is determined from at least an average pedestrian travel speed.

9. The method of claim 1, wherein the telematics unit is configured to terminate the navigation guidance session in response to receiving a navigation termination command from a passenger of the vehicle.

10. A method of providing navigation instructions in a vehicle, comprising:
    (a) initiating a navigation guidance session to a destination for the vehicle at a telematics unit installed to the vehicle;
    (b) determining that the vehicle has been parked in a parking location at a park time before the vehicle reaches the destination, the parking location being within a predetermined maximum distance of the destination;
    (c) determining that a user has left the vehicle while the vehicle is in the parking location;
    (d) in response to the determinations in steps (b) and (c), determining (1) a pedestrian travel distance from the parking location to the destination, and (2) a pedestrian travel time for the determined pedestrian travel distance;

(e) detecting a vehicle restart;

(f) determining a park time duration from at least the park time and the vehicle restart; and (g1) automatically continuing the navigation guidance session when the park time duration is less than the pedestrian travel time; and (g2) automatically terminating the navigation guidance session when the park time duration is at least equal to the pedestrian travel time.

11. The method of claim 10, wherein step (c) includes determining that a keyfob paired with the vehicle has left a proximity of the vehicle.

12. The method of claim 10, wherein step (c) includes determining that a Bluetooth device paired with the vehicle has left a proximity of the vehicle.

13. The method of claim 10, wherein at least one of steps (f), (g1), and (g2) includes determining a time-to-live (TTL) from at least a distance from the parking location to the destination.

14. The method of claim 13, wherein the TTL is determined from at least an average pedestrian travel speed.

15. A system for navigating a vehicle, comprising:

a telematics unit installed in the vehicle and configured to provide a route to a destination to a vehicle user in a navigation guidance session;

wherein the telematics unit is configured to determining that the vehicle has been parked in a parking location at a park time before the vehicle reaches the destination, the parking location being within a predetermined maximum distance of the destination; determine that a user has left the vehicle while the vehicle is in the parking location, determine a pedestrian travel distance from the parking location to the destination, and a pedestrian travel time for the determined pedestrian travel distance, detect a vehicle restart; and determine a park time duration from at least the park time and the vehicle restart;

wherein the telematics unit continues the navigation guidance session when the park time duration is less than the pedestrian travel time, and the telematics unit terminates the navigation guidance session when the park time duration is at least equal to the pedestrian travel time.

16. The system of claim 15, further comprising a remote facility separate from the vehicle, the remote facility configured to communicate with the vehicle to provide information used to determine the route to the destination in the navigation guidance session.

17. The system of claim 15, wherein the telematics unit is configured to continue or terminate the navigation guidance session automatically in response to determining that the park time duration is less than the pedestrian travel time or that the park time duration is at least equal to the pedestrian travel time, respectively.

18. The system of claim 15, wherein the telematics unit is configured to continue or terminate the navigation guidance session by providing a prompt to the user to continue or terminate the navigation guidance session, respectively.

19. The system of claim 15, further comprising a keyfob paired with the vehicle for starting the vehicle, wherein the telematics unit is configured to determine the user has left the vehicle when the keyfob has left a proximity of the vehicle.

20. The system of claim 15, further comprising a Bluetooth transmitter installed to the vehicle, wherein the telematics unit is configured to determine the user has left the vehicle when a Bluetooth device paired with the transmitter has become unpaired with the transmitter.

* * * * *